United States Patent
Hao et al.

(10) Patent No.: US 11,749,902 B2
(45) Date of Patent: Sep. 5, 2023

(54) DUAL-BAND SHARED-APERTURE ANTENNA ARRAY BASED ON DUAL-MODE PARALLEL WAVEGUIDE

(71) Applicant: SOUTHEAST UNIVERSITY, Jiangsu (CN)

(72) Inventors: Zhangcheng Hao, Jiangsu (CN); Yiwen Wu, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 141 days.

(21) Appl. No.: 17/608,695

(22) PCT Filed: Apr. 15, 2021

(86) PCT No.: PCT/CN2021/087601
§ 371 (c)(1),
(2) Date: Nov. 3, 2021

(87) PCT Pub. No.: WO2022/134393
PCT Pub. Date: Jun. 30, 2022

(65) Prior Publication Data
US 2022/0271435 A1    Aug. 25, 2022

(30) Foreign Application Priority Data
Dec. 21, 2020    (CN) .......................... 202011514138.5

(51) Int. Cl.
*H01Q 21/00*    (2006.01)
*H01Q 21/06*    (2006.01)
*H01Q 21/30*    (2006.01)

(52) U.S. Cl.
CPC ....... *H01Q 21/005* (2013.01); *H01Q 21/0075* (2013.01); *H01Q 21/068* (2013.01); *H01Q 21/30* (2013.01)

(58) Field of Classification Search
CPC .... H01Q 21/005; H01Q 21/068; H01Q 21/30; H01Q 21/0031; H01Q 1/38; H01Q 1/50;
(Continued)

(56) References Cited

U.S. PATENT DOCUMENTS 7,358,497 B1 *  4/2008  Boreman ............. H01Q 21/064
                                                         250/332
9,013,359 B2 *  4/2015  Lenormand ........ H04B 7/18508
                                                         343/771
(Continued)

FOREIGN PATENT DOCUMENTS

CN    101320846 A    12/2008
CN    107069230 A    8/2017
(Continued)

*Primary Examiner* — Vibol Tan
(74) *Attorney, Agent, or Firm* — Muncy, Geissler, Olds & Lowe, P.C.

(57) ABSTRACT

A dual-band shared-aperture antenna array based on a dual-mode parallel waveguide is applicable to the field of wireless communications technologies. The dual-band shared-aperture antenna array includes: a waveguide-substrate integrated waveguide transition structure, a multi-stage cascaded power splitter, a transverse coupling slot, a longitudinal coupling slot, a matching through-hole, a shared-aperture dual-mode parallel waveguide, and a shared-aperture parallel slot array. The entire structure includes two dielectric substrates. A signal is input to the multi-stage cascaded power splitter through the waveguide-substrate integrated waveguide transition structure located on a bottom-layer substrate. The foregoing dual-band shared-aperture antenna array based on a dual-mode parallel waveguide can separately implement a low-band fixed-beam slot array antenna, a high-band multi-beam long slot leaky-wave antenna, or a fixed-beam slot array antenna. It has a simple structure, multiple functions, high integration, a small size and light weight.

8 Claims, 10 Drawing Sheets

(58) Field of Classification Search
CPC ... H01Q 1/523; H01Q 21/0006; H01Q 21/064
See application file for complete search history.

(56) References Cited

U.S. PATENT DOCUMENTS

| | | | |
|---|---|---|---|
| 10,468,780 B1 * | 11/2019 | Milroy | H01Q 15/0093 |
| 10,879,616 B2 * | 12/2020 | Cheng | H01Q 13/10 |
| 11,342,684 B2 * | 5/2022 | Wang | H01Q 1/3233 |
| 2019/0305415 A1 * | 10/2019 | Sharawi | H01Q 1/523 |
| 2020/0059007 A1 | 2/2020 | Wang | |

FOREIGN PATENT DOCUMENTS

| | | | | |
|---|---|---|---|---|
| CN | 107579344 A | 1/2018 | | |
| CN | 112259962 A | 1/2021 | | |
| WO | WO-2021068442 A1 * | 4/2021 | | H01P 5/184 |

* cited by examiner

DUAL-BAND SHARED-APERTURE ANTENNA ARRAY BASED ON DUAL-MODE PARALLEL WAVEGUIDE

TECHNICAL FIELD

The present invention relates to an antenna array, and is particularly applicable to a dual-band shared-aperture antenna array based on a dual-mode parallel waveguide, which is used in the field of wireless communications technologies.

BACKGROUND

With the rapid development of wireless communications technologies, rapidly increasing communications requirements pose increasingly high requirements on communications devices such as an antenna at a front end of a system, for example, multi-band, multi-function, high gain, and miniaturization. Therefore, to meet increasing communication requirements, a multi-band shared-aperture antenna array emerges. In a common system, antennas of different frequency bands are designed separately, and each frequency band occupies one radiation interface. As a result, the antenna system is large in size and weight. The multi-band shared-aperture antenna array integrates antennas of different frequency bands into a same radiation aperture, and ensures that each antenna can work independently, thereby effectively reducing an overall size and weight of the antenna, making full use of the antenna aperture, reducing manufacturing costs, and ensuring rich content of received and received signals.

W band is widely studied in imaging, radar and communication systems. A W-band antenna is an indispensable part of a W-band wireless application. A substrate integrated waveguide technology has advantages of low costs, small loss, and easy integration, and is widely used in a millimeter wave band. Therefore, research on a W-band dual-band shared-aperture antenna based on a substrate integrated waveguide technology is very important in applications such as imaging, radar, and communications systems.

SUMMARY

Objective of the present invention: To address the disadvantages of the foregoing technologies, a dual-band shared-aperture antenna array based on a dual-mode parallel waveguide is provided with a simple structure, multiple functions, high integration, small size, and light weight.

Technical solution: To implement the objective of the present invention, the present invention provides a dual-band shared-aperture antenna array based on a dual-mode parallel waveguide, including: a low-frequency waveguide-substrate integrated waveguide transition structure, a low-frequency multi-stage cascaded power splitter, a transverse coupling slot, a high-frequency waveguide-substrate integrated waveguide transition structure, a high-frequency multi-stage cascaded power splitter, a longitudinal coupling slot, a bottom-layer matching through-hole, a bottom-layer substrate integrated waveguide sidewall, a top-layer matching through-hole, a shared-aperture dual-mode parallel waveguide, and a shared-aperture parallel slot array, where the shared-aperture parallel slot array includes a shared-aperture parallel long slot array or a shared-aperture parallel short slot array; a low-frequency signal provided by a standard waveguide first passes through the low-frequency waveguide-substrate integrated waveguide transition structure located on a bottom-layer substrate, then is input to the low-frequency multi-stage cascaded power splitter, and then is transmitted through the transverse coupling slot to the shared-aperture dual-mode parallel waveguide located at a top layer; finally, the shared-aperture parallel long slot array or the shared-aperture parallel short slot array included in the shared-aperture parallel slot array is used to radiate an electromagnetic wave, to form a low-band fixed-beam slot array antenna; in addition, a high-frequency signal provided by the standard waveguide first passes through the high-frequency waveguide-substrate integrated waveguide transition structure located on the bottom-layer substrate, then is input to the high-frequency multi-stage cascaded power splitter, and then is transmitted through the longitudinal coupling slot to the shared-aperture dual-mode parallel waveguide located at the top layer; and finally, a high-band multi-beam long slot leaky-wave antenna is formed by radiating an electromagnetic wave by using the shared-aperture parallel long slot array, or a high-band fixed-beam slot array antenna is formed by radiating an electromagnetic wave by using the shared-aperture parallel short slot array.

By changing a distance from the bottom-layer matching through-hole to the longitudinal coupling slot, a distance from the longitudinal coupling slot to the substrate integrated waveguide sidewall, and a diameter size of the top-layer matching through-hole, good matching between the high-frequency multi-stage cascaded power splitter and the top-layer shared-aperture dual-mode parallel waveguide can be implemented; and by changing a period spacing of the shared-aperture parallel long slot array or the shared-aperture parallel short slot array, a working frequency of the low-band fixed-beam slot array antenna can be conveniently adjusted, thereby implementing flexible adjustment and control of a frequency ratio of the low-band fixed-beam antenna to the high-band multi-beam long slot leaky-wave antenna or the fixed-beam slot array antenna.

It includes a bottom-layer dielectric substrate and a top-layer dielectric substrate that are combined up and down, and a metal layer on the substrate is double-sided, where the low-frequency waveguide-substrate integrated waveguide transition structure, the low-frequency multi-stage cascaded power splitter, the transverse coupling slot, the high-frequency waveguide-substrate integrated waveguide transition structure, the high-frequency multi-stage cascaded power splitter, the longitudinal coupling slot, the bottom-layer matching through-hole, and the bottom-layer substrate integrated waveguide sidewall are provided on the bottom-layer dielectric substrate, and the top-layer dielectric substrate includes the transverse coupling slot, the longitudinal coupling slot, the top-layer matching through-hole, the shared-aperture dual-mode parallel waveguide, and the shared-aperture parallel long slot array, or the shared-aperture parallel short slot array; the shared-aperture parallel slot array is a slot array formed by the metal layer printed on an upper surface of the top-layer dielectric substrate at an intermediate position, the shared-aperture dual-mode parallel waveguide is formed by metal through-holes provided around the shared-aperture parallel slot array, equal-length transverse coupling slots are disposed on a bottom side of the shared-aperture parallel slot array and a lower surface of the top-layer dielectric substrate, and the shared-aperture parallel slot array and left and right sides of the transverse coupling slot are respectively provided with longitudinal coupling slots located on the lower surface of the top-layer dielectric substrate; the bottom-layer dielectric substrate is located in a position directly below the top-layer dielectric substrate; the low-frequency multi-stage cascaded power splitter is disposed in the bottom dielectric of the bottom-layer substrate; the low-frequency multi-stage cascaded power splitter is formed by cascading N stages of two-channel substrate integrated waveguide power splitters; the low-frequency waveguide-substrate integrated waveguide transition structure is disposed at the top of the low-frequency multi-stage cascaded power splitter, and the low-frequency waveguide-substrate integrated waveguide transition structure is formed by a rectangular substrate integrated waveguide cavity on the bottom-layer dielectric substrate and a rectangular slot on a lower surface of the bottom-layer dielectric substrate, and finally is split into $2^N$-channels of substrate integrated waveguides to connect to the shared-aperture dual-mode parallel waveguide; the high-frequency multi-stage cascaded power splitter is disposed on the right bottom-layer dielectric substrate of the shared-aperture parallel slot array; the high-frequency multi-stage cascaded power splitter is formed by cascading M stages of two-channel substrate integrated waveguide power splitters; a top end thereof is the high-frequency waveguide-substrate integrated waveguide transition structure, and the high-frequency waveguide-substrate integrated waveguide transition structure is formed by the rectangular substrate integrated waveguide cavity on the bottom-layer dielectric substrate and the rectangular slot on the lower surface of the bottom-layer dielectric substrate, and finally is split into $2^M$-channels of substrate integrated waveguides to connect to the shared-aperture dual-mode parallel waveguide; the transverse coupling slot and the longitudinal coupling slot are simultaneously located at a metal layer of an upper surface of the bottom-layer dielectric substrate and a metal layer of the lower surface of the top-layer dielectric substrate; the bottom-layer matching through-hole and the bottom-layer substrate integrated waveguide sidewall are located in the bottom-layer dielectric substrate, the top-layer matching through-hole is located in the top-layer dielectric substrate, and both the matching through-hole and the top-layer matching through-hole are located on a same side of the coupling slot.

The low-frequency signal provided by the standard waveguide passes through the low-frequency waveguide-substrate integrated waveguide transition structure located on the bottom-layer substrate, and is input to the low-frequency multi-stage cascaded power splitter, the low-frequency multi-stage cascaded power splitter is formed by cascading N stages of two-channel substrate integrated waveguide power splitters, and the low-frequency multi-stage cascaded power splitter divides the signal into $\frac{1}{2}^N$ with an equal amplitude and a same phase; then, a plane wave is excited in the shared-aperture dual-mode parallel waveguide located at the top layer through the transverse coupling slot; finally, an electromagnetic wave is radiated by using the shared-aperture parallel slot array to form the low-band fixed-beam slot array antenna; in addition, the high-frequency signal provided by the standard waveguide passes through the high-frequency waveguide-substrate integrated waveguide transition structure located on the bottom-layer substrate, and is input to the high-frequency multi-stage cascaded power splitter; the high-frequency multi-stage cascaded power splitter is formed by cascading M stages of two-channel substrate integrated waveguide power splitters, and the high-frequency multi-stage cascaded power splitter divides the signal into $\frac{1}{2}^M$ with an equal amplitude and a same phase; each longitudinal coupling slot may excite two electric fields with an equal amplitude and inverted phases in the shared-aperture dual-mode parallel waveguide located at the top layer; therefore, the high-band M-stage cascaded power splitter excites distribution of $2^{M+1}$ electric fields with an equal amplitude and inverted phases in the shared-aperture dual-mode parallel waveguide located at the top layer by using the longitudinal coupling slot, the bottom-layer matching through-hole, and the top-layer matching through-hole, to form a virtual electrical wall, to excite an alternating phase wave, and finally to form the high-band multi-beam long slot leaky-wave antenna through irradiation of the shared-aperture parallel long slot array, or to form the high-band fixed-beam slot array antenna through irradiation of the shared-aperture parallel short slot array; the bottom-layer matching through-hole is located on the bottom-layer dielectric substrate, the top-layer matching through-hole is located on the top-layer dielectric substrate, and both the matching through-hole and the top-layer matching through-hole are provided on a same side of the coupling slot; finally, the low-band fixed-beam slot array antenna and the high-band multi-beam long slot leaky-wave antenna or the high-band fixed-beam slot array antenna are respectively implemented.

The working frequency of the low-band fixed-beam slot array antenna can be conveniently adjusted by changing the period spacing of the shared-aperture parallel slot array; the period spacing of the shared-aperture parallel slot array is approximately equal to a working wavelength of the low-band fixed-beam slot array antenna; therefore, the period spacing may be reduced to implement that the working frequency band of the low-band fixed-beam slot array antenna is shifted to a high frequency, and the period spacing may be increased to implement that the working frequency band of the low-band fixed-beam slot array antenna is shifted to a low frequency, thereby implementing flexible adjustment and control of the frequency ratio of the low-band fixed-beam antenna and the high-band multi-beam long slot leaky-wave antenna or fixed-beam slot array antenna; by reducing the period spacing of the shared-aperture parallel slot array, the working frequency band of the low-band fixed-beam antenna can be shifted to the high frequency, so as to implement a small frequency ratio of the low-band fixed-beam antenna to the high-band multi-beam long slot leaky-wave antenna or fixed-beam slot array antenna; on the contrary, by increasing the period spacing of the shared-aperture parallel slot array, the working frequency band of the low-band fixed-beam antenna can be shifted to the low frequency, so as to implement a large frequency ratio of the low-band fixed-beam antenna to the high-band multi-beam long slot leaky-wave antenna or fixed-beam slot array antenna.

The transverse coupling slot excites, in the top-layer shared-aperture dual-mode parallel waveguide, a plane wave whose electric field is distributed with an equal amplitude and a same phase; and the longitudinal coupling slot forms a virtual electric wall in the top-layer shared-aperture dual-mode parallel waveguide, and excites a wave whose electric field is distributed with alternating phases.

When the longitudinal coupling slot is designed, a matching through-hole needs to be designed to adjust impedance matching, the bottom-layer matching through-hole is located in the bottom-layer dielectric substrate, the top-layer matching through-hole is located in the top-layer dielectric substrate, and both the matching through-hole and the top-layer matching through-hole are located on a same side of the coupling slot, so that good impedance matching is ensured when the shared-aperture dual-mode parallel waveguide of the top-layer substrate excites a wave whose electric field is distributed with alternating phases.

A distance from the matching through-hole to the longitudinal coupling slot determines a width of the bottom-layer substrate integrated waveguide at a center of the longitudinal coupling slot, and therefore determines characteristic impedance of the bottom-layer substrate integrated waveguide; generally, a decrease in the distance from the matching through-hole to the longitudinal coupling slot causes a decrease in the width of the bottom-layer substrate integrated waveguide at the center of the longitudinal coupling slot, thereby increasing the characteristic impedance of the bottom-layer substrate integrated waveguide; a diameter size of the top-layer matching through-hole also determines a width of the top-layer substrate integrated waveguide at the center of the longitudinal coupling slot, and therefore determines characteristic impedance of the top-layer substrate integrated waveguide; generally, an increase in the diameter size of the top-layer matching through-hole causes a decrease in the width of the top-layer substrate integrated waveguide at the center of the longitudinal coupling slot, thereby increasing the characteristic impedance of the top-layer substrate integrated waveguide; a distance from the longitudinal coupling slot to the substrate integrated waveguide sidewall determines resonance impedance of the longitudinal coupling slot; by changing the distance from the bottom-layer matching through-hole to the longitudinal coupling slot, the distance from the longitudinal coupling slot to the substrate integrated waveguide sidewall, and the diameter size of the top-layer matching through-hole, it is ensured that resonance impedance of the longitudinal coupling slot is the same on the bottom-layer substrate integrated waveguide and the top-layer substrate integrated waveguide, thereby implementing impedance matching between the high-frequency multi-stage cascaded power splitter on the bottom-layer dielectric substrate and the shared-aperture dual-mode parallel waveguide on the top-layer dielectric substrate.

Beneficial effects: The present invention discloses a dual-band shared-aperture antenna array based on a dual-mode parallel waveguide. Compared with the prior art, the present invention has the following beneficial effects:

(1) The entire dual-band shared-aperture antenna array based on a dual-mode parallel waveguide includes two layers of dielectric substrates, metal surfaces, and metallized through-holes, and may be completed by a conventional PCB or LTCC process, and the metal surface of the dielectric substrate is double-sided.

(2) The antenna uses a transverse coupling slot in a low frequency band, and the transverse coupling slot excites a plane wave in an upper-layer shared-aperture dual-mode parallel waveguide; a longitudinal coupling slot is used in a high frequency band, and the longitudinal coupling slot forms a virtual electric wall in the upper-layer shared-aperture dual-mode parallel waveguide, and excites a wave whose electric field is distributed with alternating phases.

(3) The antenna uses the plane wave excited by the transverse coupling slot in the low frequency band and the alternating phase wave excited by the longitudinal coupling slot in the high frequency band. Electromagnetic field distribution characteristics of the two electromagnetic waves are different, and transmission directions thereof are orthogonal. Therefore, there is good isolation between the low-frequency plane wave and the high-frequency alternating phase wave.

(4) The plane wave excited by the transverse coupling slot of the antenna may excite the shared-aperture parallel slot array to form a low-band fixed-beam slot array antenna; and the alternating phase wave excited by the longitudinal coupling slot may excite the shared-aperture parallel long slot array to form a high-band multi-beam long slot leaky-wave antenna, or excite the shared-aperture parallel short slot array to form a high-band fixed-beam slot array antenna.

(5) The antenna may separately implement the low-band fixed-beam slot array antenna, the high-band multi-beam long slot leaky-wave antenna, or the high-band fixed-beam slot array antenna, so as to implement functions such as dual bands and beam scanning.

(6) The low-band antenna and the high-band antenna structure formed by the antenna include a same shared-aperture dual-mode parallel waveguide and shared-aperture parallel slot array.

(7) There is good isolation between the low-frequency planar wave and the high-frequency alternating phase wave of the antenna. Therefore, the low-band antenna and the high-band antenna that are excited based on the two electromagnetic waves have relatively high isolation.

(8) The antenna feeding network is formed by cascading multiple stages of two-channel substrate integrated waveguide power splitters, and a gain of the antenna can be improved by simply increasing a cascade number. Therefore, the dual-band shared-aperture antenna array has a relatively high gain at both the low frequency and the high frequency.

(9) A period spacing of the shared-aperture parallel long slot array or parallel short slot array of the antenna determines a working frequency of the low-band fixed-beam slot array antenna. By adjusting the period spacing of the parallel slot array, a frequency ratio of the dual-band shared-aperture antenna can be conveniently adjusted.

(10) The antenna can implement a small frequency ratio by adjusting the period spacing of the parallel slot array. This small-frequency-ratio antenna can replace a duplexer and a broadband antenna in an existing transceiver system to implement high integration and low loss.

(11) The antenna effectively reduces the overall size and weight of the antenna, so that an antenna aperture is fully utilized, manufacturing costs are reduced, and content richness of received and transmitted signals is ensured.

In the figures, 1—low-frequency waveguide-substrate integrated waveguide transition structure, 2—low-frequency multi-stage cascaded power splitter, 3—transverse coupling slot, 4—high-frequency waveguide-substrate integrated waveguide transition structure, 5—high-frequency multi-stage cascaded power splitter, 6—longitudinal coupling slot, 7—bottom-layer matching through-hole, 71—bottom-layer substrate integrated waveguide sidewall, 8—top-layer matching through-hole, 9—shared-aperture dual-mode parallel waveguide, 10—shared-aperture parallel long slot array, and 11—shared-aperture parallel short slot array.

DETAILED DESCRIPTION

To make the objectives, technical solutions, and advantages of this application clearer, the following further describes this application in detail with reference to the accompanying drawings and the embodiments. It is to be understood that the specific embodiments described herein are merely used for explaining this application, but are not intended to limit this application.

Figure 1:
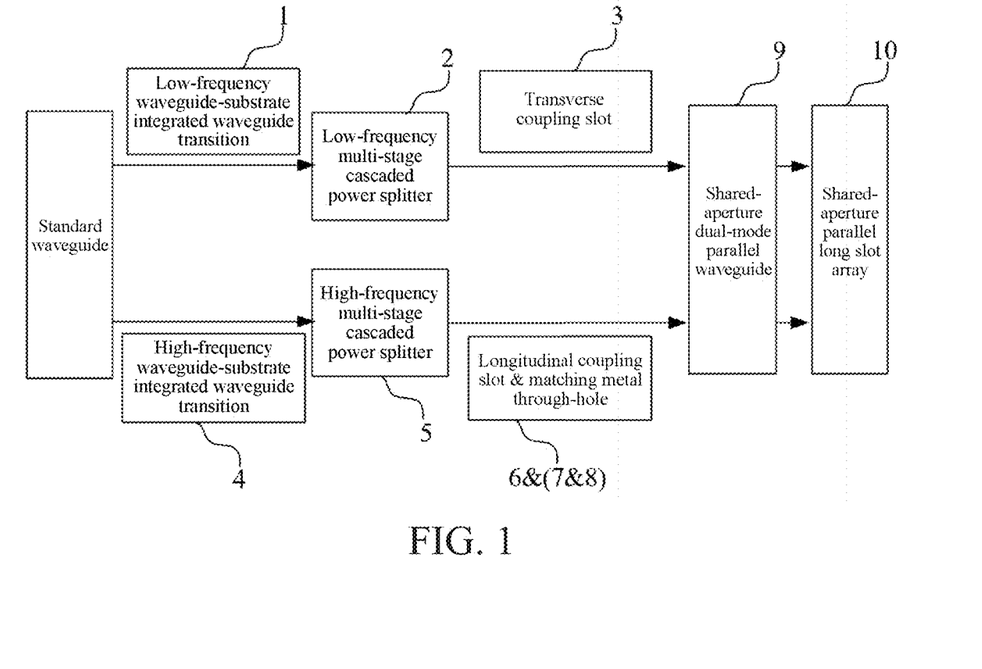
FIG. 1 is a structural block diagram of a dual-band shared-aperture parallel long slot antenna array according to the present invention.
Figure 3:
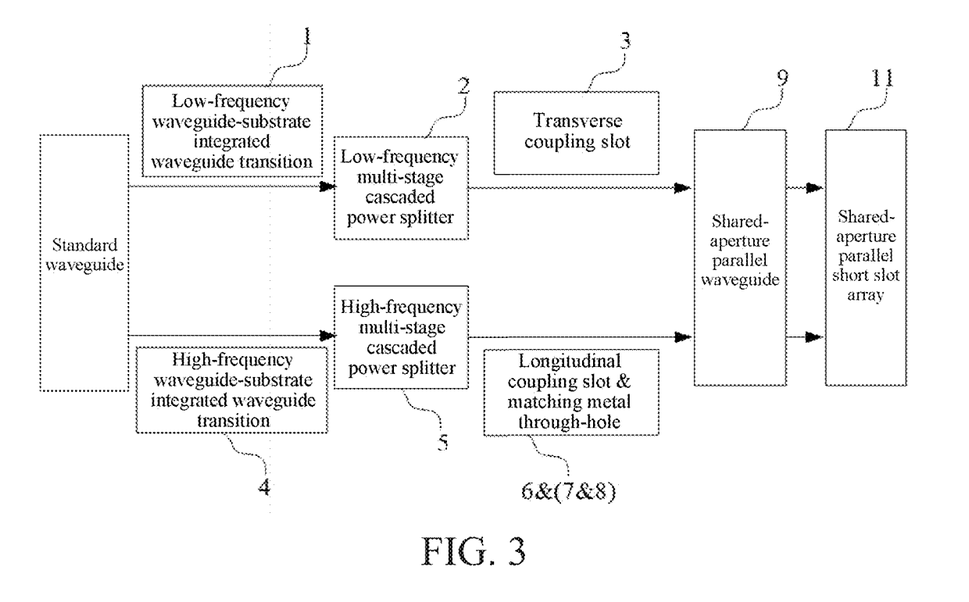
FIG. 3 is a structural block diagram of a dual-band shared-aperture parallel short slot antenna array according to the present invention.

Referring to FIG. 1 and FIG. 3, the present invention provides a dual-band shared-aperture antenna array based on a dual-mode parallel waveguide, including: a low-frequency waveguide-substrate integrated waveguide transition structure 1, a low-frequency multi-stage cascaded power splitter 2, a transverse coupling slot 3, a high-frequency waveguide-substrate integrated waveguide transition structure 4, a high-frequency multi-stage cascaded power splitter 5, a longitudinal coupling slot 6, a bottom-layer matching through-hole 7, a bottom-layer substrate integrated waveguide sidewall 71, a top-layer matching through-hole 8, a shared-aperture dual-mode parallel waveguide 9, and a shared-aperture parallel slot array, where the shared-aperture parallel slot array includes a shared-aperture parallel long slot array 10 or a shared-aperture parallel short slot array 11; a low-frequency signal provided by a standard waveguide first passes through the low-frequency waveguide-substrate integrated waveguide transition structure 1 located on a bottom-layer substrate, then is input to the low-frequency multi-stage cascaded power splitter 2, and then is transmitted through the transverse coupling slot 3 to the shared-aperture dual-mode parallel waveguide 9 located at a top layer; finally, the shared-aperture parallel long slot array 10 or the shared-aperture parallel short slot array 11 included in the shared-aperture parallel slot array is used to radiate an electromagnetic wave, to form a low-band fixed-beam slot array antenna; in addition, a high-frequency signal provided by the standard waveguide first passes through the high-frequency waveguide-substrate integrated waveguide transition structure 4 located on the bottom-layer substrate, then is input to the high-frequency multi-stage cascaded power splitter 5, and then is transmitted through the longitudinal coupling slot 6 to the shared-aperture dual-mode parallel waveguide 9 located at the top layer; and finally, a high-band multi-beam long slot leaky-wave antenna is formed by radiating an electromagnetic wave by using the shared-aperture parallel long slot array 10, or a high-band fixed-beam slot array antenna is formed by radiating an electromagnetic wave by using the shared-aperture parallel short slot array 11. By changing a distance from the bottom-layer matching through-hole 7 to the longitudinal coupling slot 6, a distance from the longitudinal coupling slot 6 to the substrate integrated waveguide sidewall 71, and a diameter size of the top-layer matching through-hole 8, good matching between the high-frequency multi-stage cascaded power splitter 5 and the top-layer shared-aperture dual-mode parallel waveguide 9 can be implemented; and by changing a period spacing of the shared-aperture parallel long slot array 10 or the shared-aperture parallel short slot array 11, a working frequency of the low-band fixed-beam slot array antenna can be conveniently adjusted, thereby implementing flexible adjustment and control of a frequency ratio of the low-band fixed-beam antenna to the high-band multi-beam long slot leaky-wave antenna or the fixed-beam slot array antenna.

The shared-aperture parallel slot array is the shared-aperture parallel long slot array 10 or the shared-aperture parallel short slot array 11, and specifically, an alternating phase wave excites the shared-aperture parallel long slot array 10 and the shared-aperture parallel short slot array 11. The alternating phase wave excites the shared-aperture parallel long slot array 10 to form a high-band multi-beam long slot leaky-wave antenna, or excites the shared-aperture parallel short slot array 11 to form a high-band fixed-beam slot array antenna.

Figure 2:
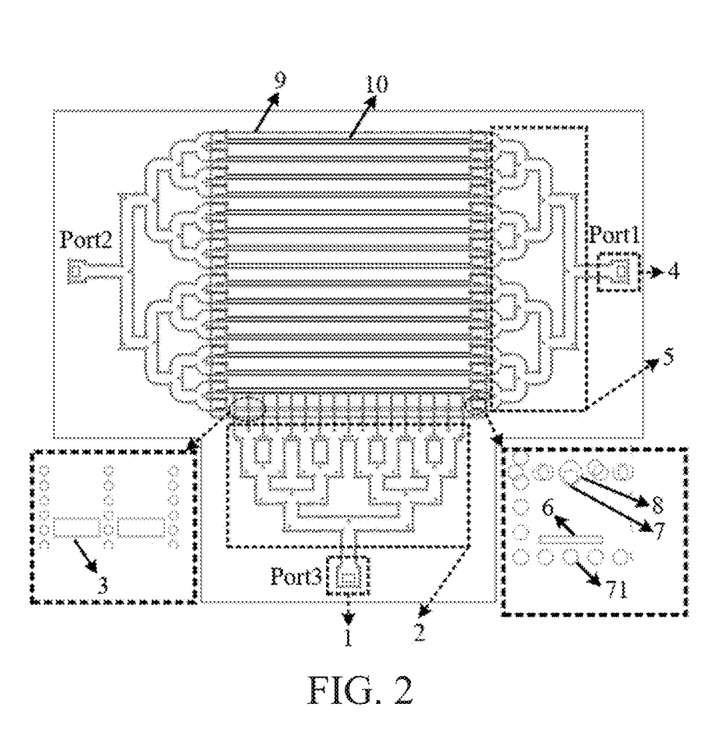
FIG. 2 is an overall schematic diagram of a dual-band shared-aperture parallel long slot antenna array according to the present invention.
Figure 4:
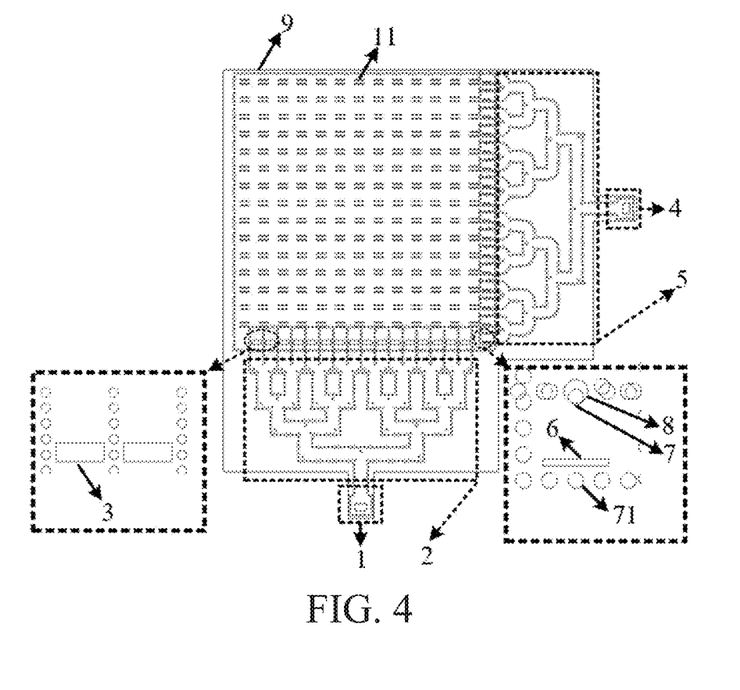
FIG. 4 is an overall schematic diagram of a dual-band shared-aperture parallel short slot antenna array according to the present invention.

As shown in FIG. 2 and FIG. 4, the dual-band shared-aperture antenna array based on a dual-mode parallel waveguide includes a bottom-layer dielectric substrate and a top-layer dielectric substrate that are combined up and down, and a metal layer on the substrate is double-sided, where the low-frequency waveguide-substrate integrated waveguide transition structure 1, the low-frequency multi-stage cascaded power splitter 2, the transverse coupling slot 3, the high-frequency waveguide-substrate integrated waveguide transition structure 4, the high-frequency multi-stage cascaded power splitter 5, the longitudinal coupling slot 6, the bottom-layer matching through-hole 7, and the bottom-layer substrate integrated waveguide sidewall 71 are provided on the bottom-layer dielectric substrate, and the top-layer dielectric substrate includes the transverse coupling slot 3, the longitudinal coupling slot 6, the top-layer matching through-hole 8, the shared-aperture dual-mode parallel waveguide 9, and the shared-aperture parallel long slot array; the shared-aperture parallel slot array is a slot array formed by the metal layer printed on an upper surface of the top-layer dielectric substrate at an intermediate position, the shared-aperture dual-mode parallel waveguide 9 is formed by metal through-holes provided around the shared-aperture parallel slot array, equal-length transverse coupling slots 3 are disposed on a bottom side of the shared-aperture parallel slot array and a lower surface of the top-layer dielectric substrate, and the shared-aperture parallel slot array and left and right sides of the transverse coupling slot 3 are respectively provided with longitudinal coupling slots 6 located on the lower surface of the top-layer dielectric substrate; the bottom-layer dielectric substrate is located in a position directly below the top-layer dielectric substrate; the low-frequency multi-stage cascaded power splitter 2 is disposed in the bottom dielectric of the bottom-layer substrate; the low-frequency multi-stage cascaded power splitter 2 is formed by cascading N stages of two-channel substrate integrated waveguide power splitters; the low-frequency waveguide-substrate integrated waveguide transition structure 1 is disposed at the top of the low-frequency multi-stage cascaded power splitter 2, and the low-frequency waveguide-substrate integrated waveguide transition structure 1 is formed by a rectangular substrate integrated waveguide cavity on the bottom-layer dielectric substrate and a rectangular slot on a lower surface of the bottom-layer dielectric substrate, and finally is split into $2^N$-channels of substrate integrated waveguides to connect to the shared-aperture dual-mode parallel waveguide 9; the high-frequency multi-stage cascaded power splitter 5 is disposed on the right bottom-layer dielectric substrate of the shared-aperture parallel slot array; the high-frequency multi-stage cascaded power splitter 5 is formed by cascading M stages of two-channel substrate integrated waveguide power splitters; a top end thereof is the high-frequency waveguide-substrate integrated waveguide transition structure 4, and the high-frequency waveguide-substrate integrated waveguide transition structure 4 is formed by the rectangular substrate integrated waveguide cavity on the bottom-layer dielectric substrate and the rectangular slot on the lower surface of the bottom-layer dielectric substrate, and finally is split into $2^M$-channels of substrate integrated waveguides to connect to the shared-aperture dual-mode parallel waveguide 9; the transverse coupling slot 3 and the longitudinal coupling slot 6 are simultaneously located at a metal layer of an upper surface of the bottom-layer dielectric substrate and a metal layer of the lower surface of the top-layer dielectric substrate; the bottom-layer matching through-hole 7 and the bottom-layer substrate integrated waveguide sidewall 71 are located in the bottom-layer dielectric substrate, the top-layer matching through-hole 8 is located in the top-layer dielectric substrate, and both the matching through-hole 7 and the top-layer matching through-hole 8 are located on a same side of the coupling slot 6.

Figure 5:
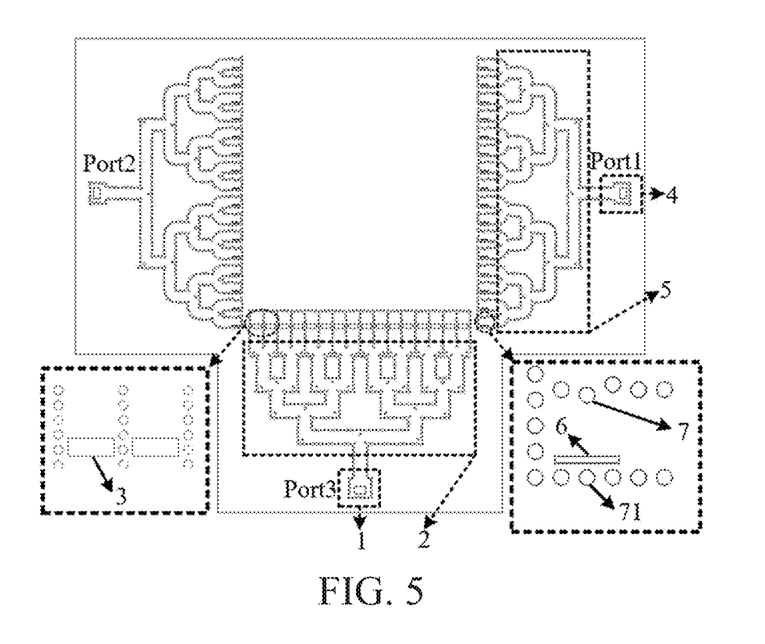
FIG. 5 is a schematic structural diagram of a bottom-layer dielectric substrate of a dual-band shared-aperture parallel long slot antenna array according to the present invention.
Figure 6:
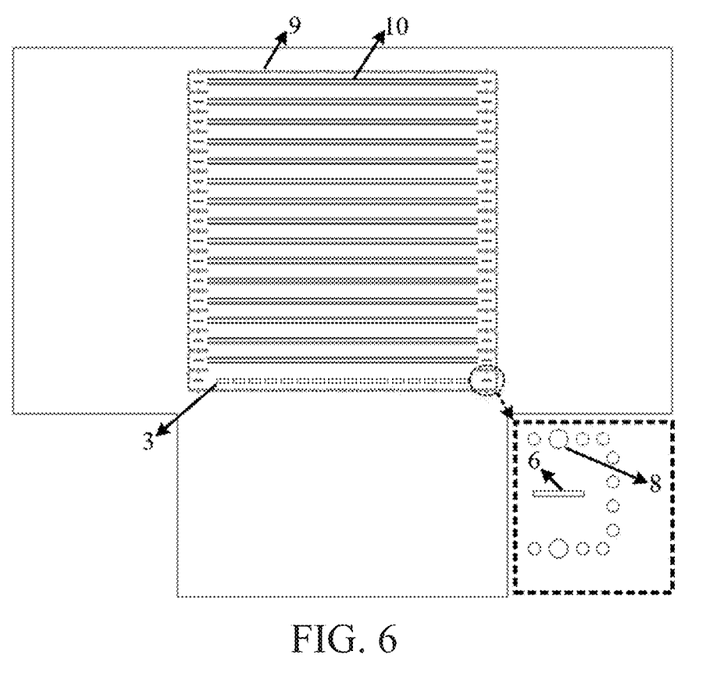
FIG. 6 is a schematic structural diagram of a top-layer dielectric substrate of a dual-band shared-aperture parallel long slot antenna array according to the present invention.

As shown in FIG. 5 and FIG. 6, the low-frequency signal provided by the standard waveguide passes through the low-frequency waveguide-substrate integrated waveguide transition structure 1 located on the bottom-layer substrate, and is input to the low-frequency multi-stage cascaded power splitter 2, the low-frequency multi-stage cascaded power splitter 2 is formed by cascading N stages of two-channel substrate integrated waveguide power splitters, and the low-frequency multi-stage cascaded power splitter 2 divides the signal into $\frac{1}{2}^N$ with an equal amplitude and a same phase; then, a plane wave is excited in the shared-aperture dual-mode parallel waveguide 9 located at the top layer through the transverse coupling slot 3; finally, an electromagnetic wave is radiated by using the shared-aperture parallel slot array to form the low-band fixed-beam long slot array antenna; in addition, the high-frequency signal provided by the standard waveguide passes through the high-frequency waveguide-substrate integrated waveguide transition structure 4 located on the bottom-layer substrate, and is input to the high-frequency multi-stage cascaded power splitter 5; the high-frequency multi-stage cascaded power splitter 5 is formed by cascading M stages of two-channel substrate integrated waveguide power splitters, and the high-frequency multi-stage cascaded power splitter 5 divides the signal into $\frac{1}{2}^M$ with an equal amplitude and a same phase; each longitudinal coupling slot 6 may excite two electric fields with an equal amplitude and inverted phases in the shared-aperture dual-mode parallel waveguide 9 located at the top layer; therefore, the high-band M-stage cascaded power splitter 5 excites distribution of $2^{M+1}$ electric fields with an equal amplitude and inverted phases in the shared-aperture dual-mode parallel waveguide 9 located at the top layer by using the longitudinal coupling slot 6, the bottom-layer matching through-hole 7, and the top-layer matching through-hole 8, to form a virtual electrical wall, to excite an alternating phase wave, and finally to form the high-band multi-beam long slot leaky-wave antenna by using the shared-aperture parallel slot array; the bottom-layer matching through-hole 7 is located on the bottom-layer dielectric substrate, the top-layer matching through-hole 8 is located on the top-layer dielectric substrate, and both the matching through-hole 7 and the top-layer matching through-hole 8 are provided on a same side of the coupling slot 6; finally, the low-band fixed-beam long slot array antenna and the high-band multi-beam long slot leaky-wave antenna are respectively implemented. The working frequency of the low-band fixed-beam slot array antenna can be conveniently adjusted by changing the period spacing of the shared-aperture parallel slot array; the period spacing of the shared-aperture parallel slot array is approximately equal to a working wavelength of the low-band fixed-beam slot array antenna; therefore, the period spacing may be reduced to implement that the working frequency band of the low-band fixed-beam slot array antenna is shifted to a high frequency, and the period spacing may be increased to implement that the working frequency band of the low-band fixed-beam slot array antenna is shifted to a low frequency, thereby implementing flexible adjustment and control of the frequency ratio of the low-band fixed-beam antenna and the high-band leaky-wave antenna; by reducing the period spacing of the shared-aperture parallel slot array, the working frequency band of the low-band fixed-beam antenna can be shifted to the high frequency, so as to implement a small frequency ratio of the low-band fixed-beam antenna to the high-band leaky-wave antenna; on the contrary, by increasing the period spacing of the shared-aperture parallel slot array, the working frequency band of the low-band fixed-beam antenna can be shifted to the low frequency, so as to implement a large frequency ratio of the low-band fixed-beam antenna to the high-band multi-beam long slot leaky-wave antenna.

A distance from the matching through-hole 7 to the longitudinal coupling slot 6 determines a width of the bottom-layer substrate integrated waveguide at a center of the longitudinal coupling slot 6, and therefore determines characteristic impedance of the bottom-layer substrate integrated waveguide; generally, a decrease in the distance from the matching through-hole 7 to the longitudinal coupling slot 6 causes a decrease in the width of the bottom-layer substrate integrated waveguide at the center of the longitudinal coupling slot 6, thereby increasing the characteristic impedance of the bottom-layer substrate integrated waveguide; a diameter size of the top-layer matching through-hole 8 also determines a width of the top-layer substrate integrated waveguide at the center of the longitudinal coupling slot 6, and therefore determines characteristic impedance of the top-layer substrate integrated waveguide; generally, an increase in the diameter size of the top-layer matching through-hole 8 causes a decrease in the width of the top-layer substrate integrated waveguide at the center of the longitudinal coupling slot 6, thereby increasing the characteristic impedance of the top-layer substrate integrated waveguide; a distance from the longitudinal coupling slot 6 to the substrate integrated waveguide sidewall 71 determines resonance impedance of the longitudinal coupling slot 6; by changing the distance from the bottom-layer matching through-hole 7 to the longitudinal coupling slot 6, the distance from the longitudinal coupling slot 6 to the substrate integrated waveguide sidewall 71, and the diameter size of the top-layer matching through-hole 8, it is ensured that resonance impedance of the longitudinal coupling slot is the same on the bottom-layer substrate integrated waveguide and the top-layer substrate integrated waveguide, thereby implementing impedance matching between the high-frequency multi-stage cascaded power splitter 5 on the bottom-layer dielectric substrate and the shared-aperture dual-mode parallel waveguide 9 on the top-layer dielectric substrate.

The transverse coupling slot 3 excites, in the top-layer shared-aperture dual-mode parallel waveguide 9, a plane wave whose electric field is distributed with an equal amplitude and a same phase; and the longitudinal coupling slot 6 forms a virtual electric wall in the top-layer shared-aperture dual-mode parallel waveguide 9, and excites a wave whose electric field is distributed with alternating phases.

When the longitudinal coupling slot 6 is designed, a matching through-hole needs to be designed to adjust impedance matching, the bottom-layer matching through-hole 7 is located in the bottom-layer dielectric substrate, the top-layer matching through-hole 8 is located in the top-layer dielectric substrate, and both the matching through-hole 7 and the top-layer matching through-hole 8 are located on a same side of the coupling slot 6, so that good impedance matching is ensured when the shared-aperture dual-mode parallel waveguide of the top-layer substrate excites a wave whose electric field is distributed with alternating phases.

In an embodiment, the transverse coupling slot 3 excites a plane wave in the top-layer shared-aperture dual-mode parallel waveguide 9; and the longitudinal coupling slot 6 forms a virtual electric wall in the top-layer shared-aperture dual-mode parallel waveguide 9, and excites a wave whose electric field is distributed with alternating phases.

In an embodiment, when the longitudinal coupling slot 6 is designed, the matching through-holes 7 and 8 need to be designed to adjust impedance matching, so that good impedance matching is ensured when the shared-aperture dual-mode parallel waveguide 9 of the top-layer substrate excites a wave whose electric field is distributed with alternating phases.

In an embodiment, the plane wave excites the shared-aperture parallel long slot array 10 or parallel short slot array 11 to form a low-band fixed-beam slot array antenna. The alternating phase wave excites the shared-aperture parallel long slot array 10 to form a high-band multi-beam long slot leaky-wave antenna, or excites the shared-aperture parallel short slot array 11 to form a high-band fixed-beam slot array antenna.

In an embodiment, the dual-band shared-aperture antenna array based on a dual-mode parallel waveguide may separately implement a low-band fixed-beam slot array antenna, a high-band multi-beam long slot leaky-wave antenna, or a high-band fixed-beam slot array antenna.

In an embodiment, the low-band antenna structure and the high-band antenna structure include a same shared-aperture dual-mode parallel waveguide 9 and shared-aperture parallel slot array 10 or 11.

In an embodiment, the waveguide-substrate integrated waveguide transition structures 1 and 4, the multi-stage cascaded power splitters 2 and 5, and the bottom-layer matching through-hole 7 are located on the bottom-layer dielectric substrate; and the top-layer matching through-hole 8, the shared-aperture dual-mode parallel waveguide 9, and the shared-aperture parallel slot array 10 or 11 are located on the top-layer substrate. The transverse coupling slot 3 and the longitudinal coupling slot 6 are simultaneously located at a metal layer of an upper surface of the bottom-layer dielectric substrate and a metal layer of the lower surface of the top-layer dielectric substrate.

Figure 7:
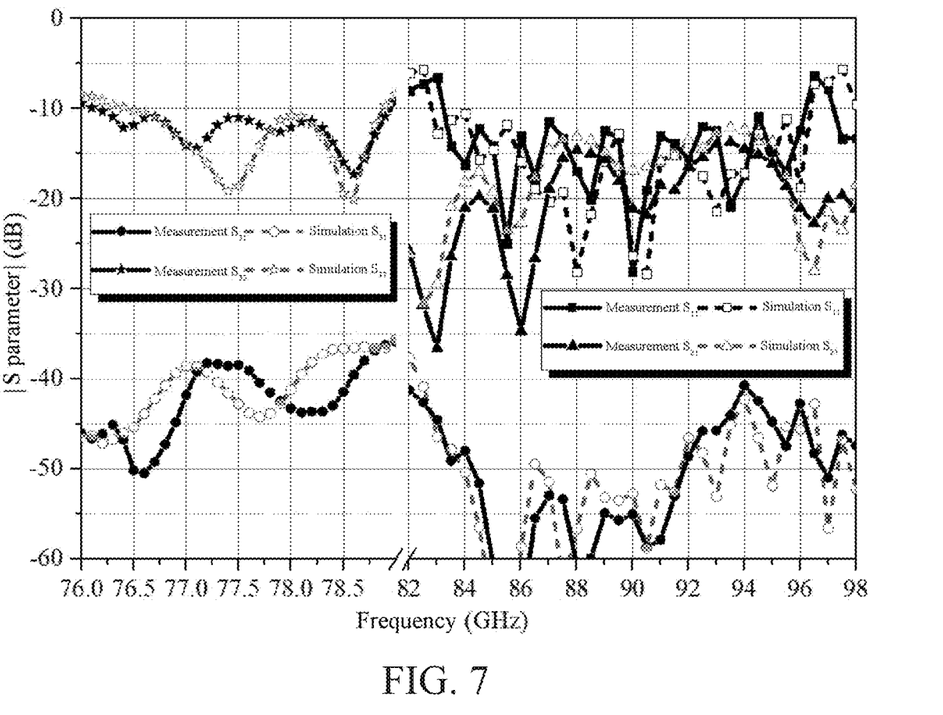
FIG. 7 is an S parameter obtained by antenna simulation and test of a dual-band shared-aperture parallel long slot antenna array according to the present invention.
Figure 8:
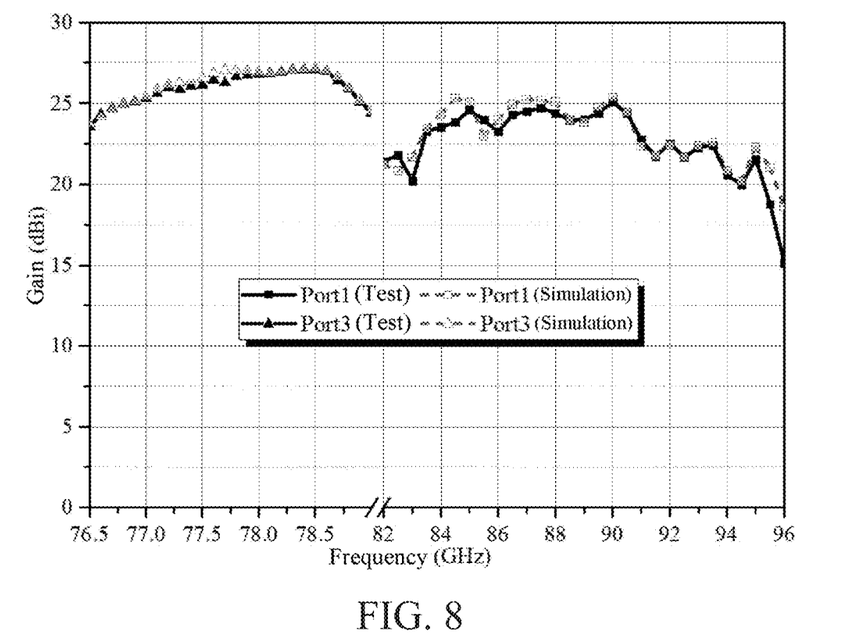
FIG. 8 is a gain obtained by antenna simulation and test of a dual-band shared-aperture parallel long slot antenna array according to the present invention.
Figure 9:
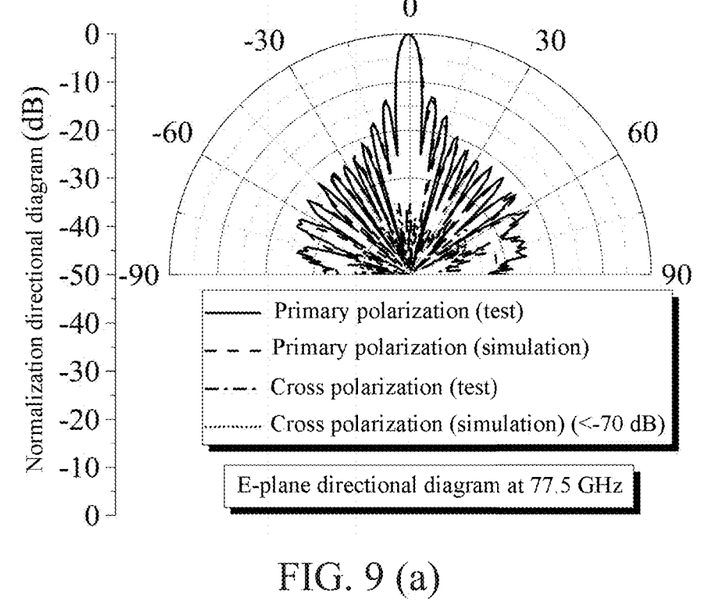
FIG. 9(a) is a normalization directional diagram of E plane of a low-band fixed-beam antenna of a dual-band shared-aperture parallel long slot antenna array according to the present invention.
FIG. 9(b) is a normalization directional diagram of H plane of a low-band fixed-beam antenna of a dual-band shared-aperture parallel long slot antenna array according to the present invention.
Figure 10:
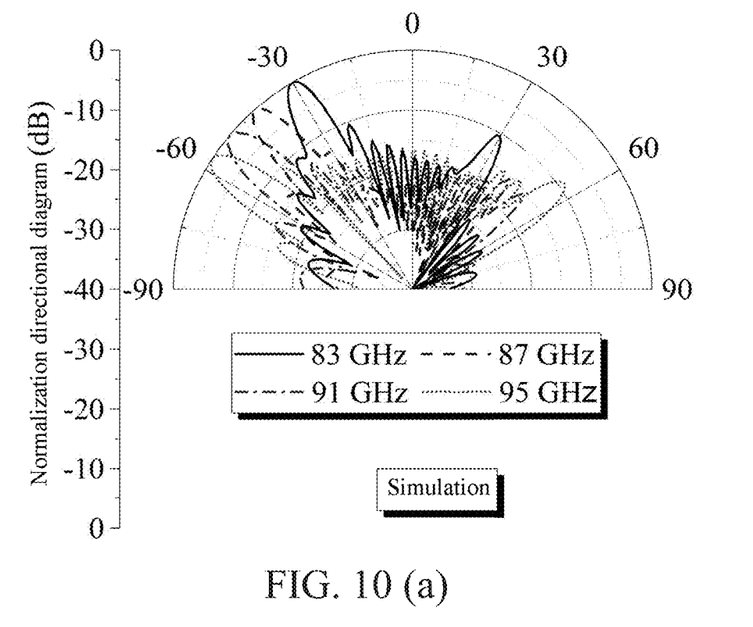
FIG. 10(a) is a normalization directional diagram of simulation of a high-band leaky-wave antenna of a dual-band shared-aperture parallel long slot antenna array according to the present invention.
FIG. 10(b) is a normalization directional diagram of measurement of a high-band leaky-wave antenna of a dual-band shared-aperture parallel long slot antenna array according to the present invention.

In an embodiment, the foregoing dual-band shared-aperture antenna array based on a dual-mode parallel waveguide may be shown by referring to FIG. 1 to FIG. 6. The dual-band shared-aperture antenna array includes the low-frequency waveguide-substrate integrated waveguide transition structure 1, the low-frequency multi-stage cascaded power splitter 2, the transverse coupling slot 3, the high-frequency waveguide-substrate integrated waveguide transition structure 4, the high-frequency multi-stage cascaded power splitter 5, the longitudinal coupling slot 6, the bottom-layer matching through-hole 7, the substrate integrated waveguide sidewall 71, the top-layer matching through-hole 8, the shared-aperture dual-mode parallel waveguide 9, and the shared-aperture parallel long slot array 10, or the shared-aperture parallel short slot array 11. Further, in this example, the dual-band shared-aperture antenna array based on a dual-mode parallel waveguide is fabricated by using a PCB process, and a related test is performed. FIG. 7 is a return loss obtained through antenna simulation and test of a dual-band shared-aperture parallel long slot antenna array. FIG. 8 is a gain obtained through simulation and test of a dual-band shared-aperture parallel long slot antenna. FIG. 9(a) and FIG. 9(b) are normalization directional diagrams of E and H planes at 77.5 GHz during simulation and test of a low-band fixed-beam antenna of a dual-band shared-aperture parallel long slot antenna array. FIG. 10(a) and FIG. 10(b) are normalization directional diagrams during simulation and measurement in a scanning plane of a high-band leaky-wave antenna of a dual-band shared-aperture parallel long slot antenna array. The test results show that the antenna can separately implement a low-band fixed-beam long slot array antenna and a high-band multi-beam long slot leaky-wave antenna, implement a dual-band shared-aperture antenna function, and features high isolation and a small frequency ratio. In addition, the antenna reduces the design size and weight of the antenna, improves aperture utilization, and reduces processing and manufacturing costs and complexity.

What is claimed is:
1. A dual-band shared-aperture antenna array based on a dual-mode parallel waveguide, comprising:
   a low-frequency waveguide-substrate integrated waveguide transition structure, a low-frequency multi-stage cascaded power splitter, a transverse coupling slot, a high-frequency waveguide-substrate integrated waveguide transition structure, a high-frequency multi-stage cascaded power splitter, a longitudinal coupling slot, a bottom-layer matching through-hole, a bottom-layer substrate integrated waveguide sidewall, a top-layer matching through-hole, a shared-aperture dual-mode parallel waveguide, and a shared-aperture parallel slot array, wherein the shared-aperture parallel slot array comprises a shared-aperture parallel long slot array or a shared-aperture parallel short slot array; a low-frequency signal provided by a standard waveguide first passes through the low-frequency waveguide-substrate integrated waveguide transition structure located on a bottom-layer substrate, then is input to the low-frequency multi-stage cascaded power splitter, and then is transmitted through the transverse coupling slot to the shared-aperture dual-mode parallel waveguide located at a top layer;

finally, the shared-aperture parallel long slot array or the shared-aperture parallel short slot array comprised in the shared-aperture parallel slot array is used to radiate an electromagnetic wave, to form a low-band fixed-beam slot array antenna; in addition, a high-frequency signal provided by the standard waveguide first passes through the high-frequency waveguide-substrate integrated waveguide transition structure located on the bottom-layer substrate, then is input to the high-frequency multi-stage cascaded power splitter, and then is transmitted through the longitudinal coupling slot to the shared-aperture dual-mode parallel waveguide located at the top layer; and finally, a high-band multi-beam long slot leaky-wave antenna is formed by radiating an electromagnetic wave by using the shared-aperture parallel long slot array, or a high-band fixed-beam slot array antenna is formed by radiating an electromagnetic wave by using the shared-aperture parallel short slot array.

2. The dual-band shared-aperture antenna array based on a dual-mode parallel waveguide according to claim 1, wherein by changing a distance from the bottom-layer matching through-hole to the longitudinal coupling slot, a distance from the longitudinal coupling slot to the substrate integrated waveguide sidewall, and a diameter size of the top-layer matching through-hole, good matching between the high-frequency multi-stage cascaded power splitter and the top-layer shared-aperture dual-mode parallel waveguide can be implemented; and by changing a period spacing of the shared-aperture parallel long slot array or the shared-aperture parallel short slot array, a working frequency of the low-band fixed-beam slot array antenna can be conveniently adjusted, thereby implementing flexible adjustment and control of a frequency ratio of the low-band fixed-beam antenna to the high-band multi-beam long slot leaky-wave antenna or the fixed-beam slot array antenna.

3. The dual-band shared-aperture antenna array based on a dual-mode parallel waveguide according to claim 1, wherein the dual-band shared-aperture antenna array comprises a bottom-layer dielectric substrate and a top-layer dielectric substrate that are combined up and down, and a metal layer on the substrate is double-sided, wherein the low-frequency waveguide-substrate integrated waveguide transition structure, the low-frequency multi-stage cascaded power splitter, the transverse coupling slot, the high-frequency waveguide-sub strate integrated waveguide transition structure, the high-frequency multi-stage cascaded power splitter, the longitudinal coupling slot, the bottom-layer matching through-hole, and the bottom-layer substrate integrated waveguide sidewall are provided on the bottom-layer dielectric substrate, and the top-layer dielectric substrate comprises the transverse coupling slot, the longitudinal coupling slot, the top-layer matching through-hole, the shared-aperture dual-mode parallel waveguide, and the shared-aperture parallel long slot array, or the shared-aperture parallel short slot array; the shared-aperture parallel slot array is a slot array formed by the metal layer printed on an upper surface of the top-layer dielectric substrate at an intermediate position, the shared-aperture dual-mode parallel waveguide is formed by metal through-holes provided around the shared-aperture parallel slot array, equal-length transverse coupling slots are disposed on a bottom side of the shared-aperture parallel slot array and a lower surface of the top-layer dielectric substrate, and the shared-aperture parallel slot array and left and right sides of the transverse coupling slot are respectively provided with longitudinal coupling slots located on the lower surface of the top-layer dielectric substrate; the bottom-layer dielectric substrate is located in a position directly below the top-layer dielectric substrate;

the low-frequency multi-stage cascaded power splitter is disposed in the bottom dielectric of the bottom-layer substrate; the low-frequency multi-stage cascaded power splitter is formed by cascading N stages of two-channel substrate integrated waveguide power splitters; the low-frequency waveguide-substrate integrated waveguide transition structure is disposed at the top of the low-frequency multi-stage cascaded power splitter, and the low-frequency waveguide-substrate integrated waveguide transition structure is formed by a rectangular substrate integrated waveguide cavity on the bottom-layer dielectric substrate and a rectangular slot on a lower surface of the bottom-layer dielectric substrate, and finally is split into $2^N$-channels of substrate integrated waveguides to connect to the shared-aperture dual-mode parallel waveguide;

the high-frequency multi-stage cascaded power splitter is disposed on the right bottom-layer dielectric substrate of the shared-aperture parallel slot array; the high-frequency multi-stage cascaded power splitter is formed by cascading M stages of two-channel substrate integrated waveguide power splitters; a top end thereof is the high-frequency waveguide-substrate integrated waveguide transition structure, and the high-frequency waveguide-substrate integrated waveguide transition structure is formed by the rectangular substrate integrated waveguide cavity on the bottom-layer dielectric substrate and the rectangular slot on the lower surface of the bottom-layer dielectric substrate, and finally is split into $2^m$-channels of substrate integrated waveguides to connect to the shared-aperture dual-mode parallel waveguide; the transverse coupling slot and the longitudinal coupling slot are simultaneously located at a metal layer of an upper surface of the bottom-layer dielectric substrate and a metal layer of the lower surface of the top-layer dielectric substrate; the bottom-layer matching through-hole and the bottom-layer substrate integrated waveguide sidewall are located in the bottom-layer dielectric substrate, the top-layer matching through-hole is located in the top-layer dielectric substrate, and both the matching through-hole and the top-layer matching through-hole are located on a same side of the coupling slot.

4. The dual-band shared-aperture antenna array based on a dual-mode parallel waveguide according to claim 1, wherein the low-frequency signal provided by the standard waveguide passes through the low-frequency waveguide-substrate integrated waveguide transition structure located on the bottom-layer substrate, and is input to the low-frequency multi-stage cascaded power splitter, the low-frequency multi-stage cascaded power splitter is formed by cascading N stages of two-channel substrate integrated waveguide power splitters, and the low-frequency multi-stage cascaded power splitter divides the signal into $1/2^N$ with an equal amplitude and a same phase; then, a plane wave is excited in the shared-aperture dual-mode parallel waveguide located at the top layer through the transverse coupling slot; finally, an electromagnetic wave is radiated by using the shared-aperture parallel slot array to form the low-band fixed-beam slot array antenna; in addition, the high-frequency signal provided by the standard waveguide passes through the high-frequency waveguide-substrate integrated waveguide transition structure located on the bottom-layer substrate, and is input to the high-frequency multi-stage cascaded power splitter; the high-frequency multi-stage cascaded power splitter is formed by cascading M stages of two-channel substrate integrated waveguide power splitters, and the high-frequency multi-stage cascaded power splitter divides the signal into $1/2^m$ with an equal amplitude and a same phase; each longitudinal coupling slot may excite two electric fields with an equal amplitude and inverted phases in the shared-aperture dual-mode parallel waveguide located at the top layer; therefore, the high-band M-stage cascaded power splitter excites distribution of $2^{M+1}$ electric fields with an equal amplitude and inverted phases in the shared-aperture dual-mode parallel waveguide located at the top layer by using the longitudinal coupling slot, the bottom-layer matching through-hole, and the top-layer matching through-hole, to form a virtual electrical wall, to excite an alternating phase wave, and finally to form the high-band multi-beam long slot leaky-wave antenna through irradiation of the shared-aperture parallel long slot array or to form the high-band fixed-beam slot array antenna through irradiation of the shared-aperture parallel short slot array; the bottom-layer matching through-hole is located on the bottom-layer dielectric substrate, the top-layer matching through-hole is located on the top-layer dielectric substrate, and both the matching through-hole and the top-layer matching through-hole are provided on a same side of the coupling slot; finally, the low-band fixed-beam slot array antenna and the high-band multi-beam long slot leaky-wave antenna or the high-band fixed-beam slot array antenna are respectively implemented.

5. The dual-band shared-aperture antenna array based on a dual-mode parallel waveguide according to claim 1, wherein the working frequency of the low-band fixed-beam slot array antenna can be conveniently adjusted by changing the period spacing of the shared-aperture parallel slot array; the period spacing of the shared-aperture parallel slot array is approximately equal to a working wavelength of the low-band fixed-beam slot array antenna;

therefore, the period spacing may be reduced to implement that the working frequency band of the low-band fixed-beam slot array antenna is shifted to a high frequency, and the period spacing may be increased to implement that the working frequency band of the low-band fixed-beam slot array antenna is shifted to a low frequency, thereby implementing flexible adjustment and control of the frequency ratio of the low-band fixed-beam antenna and the high-band multi-beam long slot leaky-wave antenna or fixed-beam slot array antenna; by reducing the period spacing of the shared-aperture parallel slot array, the working frequency band of the low-band fixed-beam antenna can be shifted to the high frequency, so as to implement a small frequency ratio of the low-band fixed-beam antenna to the high-band multi-beam long slot leaky-wave antenna or fixed-beam slot array antenna; on the contrary, by increasing the period spacing of the shared-aperture parallel slot array, the working frequency band of the low-band fixed-beam antenna can be shifted to the low frequency, so as to implement a large frequency ratio of the low-band fixed-beam antenna to the high-band multi-beam long slot leaky-wave antenna or fixed-beam slot array antenna.

6. The dual-band shared-aperture antenna array based on a dual-mode parallel waveguide according to claim 1, wherein the transverse coupling slot excites, in the top-layer shared-aperture dual-mode parallel waveguide, a plane wave whose electric field is distributed with an equal amplitude and a same phase; and the longitudinal coupling slot forms a virtual electric wall in the top-layer shared-aperture dual-mode parallel waveguide, and excites a wave whose electric field is distributed with alternating phases.

7. The dual-band shared-aperture antenna array based on a dual-mode parallel waveguide according to claim 1, wherein when the longitudinal coupling slot is designed, a matching through-hole needs to be designed to adjust impedance matching, the bottom-layer matching through-hole is located in the bottom-layer dielectric substrate, the top-layer matching through-hole is located in the top-layer dielectric substrate, and both the matching through-hole and the top-layer matching through-hole are located on a same side of the coupling slot, so that good impedance matching is ensured when the shared-aperture dual-mode parallel waveguide of the top-layer substrate excites a wave whose electric field is distributed with alternating phases.

8. The dual-band shared-aperture antenna array based on a dual-mode parallel waveguide according to claim 3, wherein a distance from the matching through-hole to the longitudinal coupling slot determines a width of the bottom-layer substrate integrated waveguide at a center of the longitudinal coupling slot, and therefore determines characteristic impedance of the bottom-layer substrate integrated waveguide; generally, a decrease in the distance from the matching through-hole to the longitudinal coupling slot causes a decrease in the width of the bottom-layer substrate integrated waveguide at the center of the longitudinal coupling slot, thereby increasing the characteristic impedance of the bottom-layer substrate integrated waveguide; a diameter size of the top-layer matching through-hole also determines a width of the top-layer substrate integrated waveguide at the center of the longitudinal coupling slot, and therefore determines characteristic impedance of the top-layer substrate integrated waveguide; generally, an increase in the diameter size of the top-layer matching through-hole causes a decrease in the width of the top-layer substrate integrated waveguide at the center of the longitudinal coupling slot, thereby increasing the characteristic impedance of the top-layer substrate integrated waveguide; a distance from the longitudinal coupling slot to the substrate integrated waveguide sidewall determines resonance impedance of the longitudinal coupling slot; by changing the distance from the bottom-layer matching through-hole to the longitudinal coupling slot, the distance from the longitudinal coupling slot to the substrate integrated waveguide sidewall, and the diameter size of the top-layer matching through-hole, it is ensured that resonance impedance of the longitudinal coupling slot is the same on the bottom-layer substrate integrated waveguide and the top-layer substrate integrated waveguide, thereby implementing impedance matching between the high-frequency multi-stage cascaded power splitter on the bottom-layer dielectric substrate and the shared-aperture dual-mode parallel waveguide on the top-layer dielectric substrate.

\* \* \* \* \*